(12) United States Patent
Aoyama et al.

(10) Patent No.: US 6,359,851 B2
(45) Date of Patent: Mar. 19, 2002

(54) OPTICAL INFORMATION DETECTION APPARATUS

(75) Inventors: Nobuhide Aoyama; Shinya Hasegawa, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/772,659

(22) Filed: Jan. 30, 2001

Related U.S. Application Data (62) Division of application No. 09/138,633, filed on Aug. 24, 1998, now Pat. No. 6,212,152.

(30) Foreign Application Priority Data

Feb. 4, 1998 (JP) .......................................... 10-023147

(51) Int. Cl.⁷ ................................................ G11B 7/00
(52) U.S. Cl. ............................ 369/112.28; 369/112.21; 359/834
(58) Field of Search ....................... 369/112.28, 112.17, 369/112.18, 112.19, 112.21, 44.23; 359/831, 833, 834, 837, 487, 494, 495, 496

(56) References Cited

U.S. PATENT DOCUMENTS

| | | | |
|---|---|---|---|
| 4,712,205 A | * 12/1987 | Smid et al. ............ | 369/112.28 |
| 5,491,675 A | 2/1996 | Kay ....................... | 369/44.23 |
| 5,623,462 A | 4/1997 | Tezuka et al. ........... | 369/44.23 |
| 5,761,162 A | 6/1998 | Gerber et al. ........... | 369/44.23 |
| 5,831,942 A | 11/1998 | Morimoto et al. ........... | 369/13 |
| 5,859,819 A | 1/1999 | Miyabe et al. ........... | 369/44.41 |

FOREIGN PATENT DOCUMENTS

| | | |
|---|---|---|
| EP | 469580 | 2/1992 |
| EP | 630005 | 12/1994 |
| EP | 638896 | 2/1995 |
| JP | 57167145 | 10/1982 |
| JP | 62267932 | 11/1987 |
| JP | 6344325 | 2/1988 |
| JP | 6344326 | 2/1988 |
| JP | 8221820 | 8/1996 |
| JP | 8329470 | 12/1996 |
| JP | 9128825 | 5/1997 |
| JP | 9161347 | 6/1997 |
| JP | 9212928 | 8/1997 |

* cited by examiner

Primary Examiner—Thang V. Tran
(74) Attorney, Agent, or Firm—Greer, Burns & Crain, Ltd.

(57) ABSTRACT

An optical information detecting apparatus includes a first optical system focusing an optical beam on a recording surface of a recording medium and a second optical system directing a reflection optical beam produced as a result of reflection of the optical beam by a recording surface of the recording medium to a photodetection unit. The second optical system includes a beam dividing element disposed so as to interrcept the reflection optical beam and divide the reflection beam into a plurality of optical beam elements traveling generally parallel with each other in the reflection optical beam, such that the plurality of optical beam elements reach the photodetection unit along respective optical paths.

4 Claims, 9 Drawing Sheets

OPTICAL INFORMATION DETECTION APPARATUS

This is a divisional of application Ser. No. 09/138,633 filed Aug. 24, 1998, now U.S. Pat. No. 6,212,152 B1.

BACKGROUND OF THE INVENTION

1. Field of the Invention

The present invention generally relates to reading of information from an optical recording medium and more particularly to a compact and high-density optical information detection apparatus capable of reproducing information from a high-density optical recording medium in which information is recorded on both a land and a groove that define a track. More specifically, the present invention relates to an optical information detection apparatus in which cross-talk between the information read out from the land and read out from the groove is minimized and wherein the resolution at the time of detection of the recorded information is improved.

Optical disks are used extensively as the recording medium of various information including audio and visual data. In relation to the art of high-density rewritable recording of information, intensive efforts are being made particularly with regard to the development of rewritable optical disks such as a magneto-optical disk or a phase transition disk.

In order to increase the recording density of such optical disks, it is desired to decrease the wavelength of the optical beam used for information detection or to increase the numerical aperture of the objective lens such that the beam spot of the optical beam on the recording medium is reduced.

Further, there is a proposal to use MSR (magnetic super-resolution) technology. It should be noted that the MSR technology attempts to increase the recording density of a magneto-optical recording medium while using the optical beam of the same spot size, by suppressing the cross-talk between the tracks or between the recording marks aligned in the tangential direction of the track as much as possible. However, the MSR technology still includes various problems related to resolution which appear conspicuously when the track pitch is reduced, such as the decrease of tracking performance or the increase of the crosstalk. In the case of a rewritable optical disk such as a magneto-optical disk, the cross-erasing of information becomes also a serious problem.

Meanwhile, there is a proposal of so-called land-groove recording technology that increases the effective track recording density twice as compared with the conventional land recording technology or groove recording technology. In the conventional land recording technology or groove recording technology, the information is recorded only on the land or on the groove that defines a track, while the information is recorded both on the land and the groove in the land-groove recording technology.

In the land-groove recording technology, in which lands and grooves are separated three-dimensionally, the problem of cross-erasing of information is effectively suppressed as a result of the spatial separation of the lands and the grooves. Thus, the land-groove recording technology is thought an effective approach to increase the recording density of optical disks including rewritable optical disks. In order to reduce this promising technology into practice, however, it is necessary to devise a method of suppressing the cross-talk further.

2. Description of the Prior Art

Conventionally, there is a proposal to reduce the cross-talk as described in the Japanese patent application 9-16134, wherein this prior application achieves the desired suppressing of the cross-talk between the lands and the grooves by applying a phase compensation to the optical signals produced by the lands and produced by grooves of the optical recording medium independently. When the desired increase of the line recording density is to be achieved according to this prior application while using the same spot size for the optical beam, on the other hand, there is a need of a further process for compensating for the decrease of the reproduced signal output. It should be noted that such a decrease of the reproduced signal output is caused by the interference of the recording marks aligned on a track.

With regard to the improvement of resolution of the reproduced signal output for the recording marks aligned on a track, there is a proposal of optical super-resolution by Milster, T. D., et al., Japanese J. Appl. Phys. vol.32, 1993, pp.5397–5401, in which a shading band is provided in the optical path which is used for detecting the information from an optical disk. Thereby, the shading band functions as an optical equalizer.

Further, in view of the recent trend of technology that targets an integrated optical head carrying a hologram, it is desired that the high-density recording method is compatible with the construction of such integrated optical heads.

Furthermore, there is a proposal of optical information detection method as disclosed in the Japanese Laid-Open Patent Publication 9-128825, in which simultaneous detection of different information is achieved by dividing a reflected optical beam into several optical beams by using one or more optical beam splitters. It should be noted that the process of this prior art achieves the optical beam splitting with respect to the entirety of the optical beam, by disposing the optical beam splitter so as to intercept the entire optical beam that is reflected by the optical recording medium and traveling toward an optical detection system.

With regard to the process of the Japanese patent application 9-16134 noted before, it is confirmed that the MSR process is an effective approach for suppressing the cross-talk between the tracks and the interference between the recording marks aligned on a track. On the other hand, the process of the foregoing prior application has a drawback in that it requires at least two magneto-optical layers on the magneto-optical recording medium and that a high optical power has to be used for the optical beam used for reading information. Further, there is an additional drawback in that an exact control of the optical beam power is necessary such that the optical beam power fails within a narrow tolerance range.

In addition to the foregoing, the process of the Japanese patent application 9-16134 has a drawback in that, while the problem of the cross-talk between the tracks may be successfully reduced, the reproduced optical beam tends to have an ecliptic polarization state due to the admixing of polarization components having a mutual phase offset corresponding to twice the depth of the groove, into the reflected optical beam. It should be noted that such an admixing of the polarization component occurs as a result of the reflection of the optical beam at the land and the groove adjacent thereto. When this occurs, the output of the reproduced signal is deteriorated inevitably. In order to avoid this problem, it is necessary to provide an appropriate optical phase compensation process.

It is possible to achieve the desired increase of the track recording density and the linear recording density without using the MSR technology, by combining the optical super-resolution of the Milster et al., op. cit., which uses a shading band, with the optical phase compensation process applied separately to the optical beams reflected from the lands and reflected from the grooves. However, such a process requires a construction in which the optical shading band and the optical phase compensation device are provided for each of the optical beams reflected by the lands and the grooves, and the construction of the optical system becomes inevitably bulky and complex.

In the process of Japanese Laid-Open Patent Publication 9-128825, which divides the reflected optical beam into a plurality of optical beam elements, on the other hand, there has been a problem in that it is difficult to construct the optical information detection apparatus to have a compact size, due to the fact that the beam splitting is applied to the entirety of the reflected optical beam at several locations of the optical path of the reflected optical beam and that it is necessary to provide a detection optical system to each of the optical beams thus divided.

SUMMARY OF THE INVENTION

Accordingly, it is a general object of the present invention to provide a novel and useful optical information detection apparatus wherein the foregoing problems are eliminated.

Another and more specific object of the present invention is to provide a compact and efficient optical information detection apparatus that is capable of detecting various different information recorded on an optical recording medium.

Another object of the present invention is to provide an optical information detection apparatus, comprising:

a turn-table adapted for holding an optical disk thereon rotatably, said optical disk including a land and an adjacent groove formed on a surface thereof, both of said land and groove carrying respective information;

a motor connected to said turn-table so as to rotate said turn-table;

an optical source emitting an optical beam;

a first optical system directing said optical beam from said optical source to said optical disk held in a state that said optical disk is held on said turn-table;

a second optical system collecting and guiding a reflection optical beam produced by a reflection of said optical beam at said surface of said optical disk in a state that said optical disk is held on said turn-table;

a beam dividing element dividing said reflection optical beam into a plurality of optical beam elements each corresponding to a part of said reflection optical beam and traveling side by side in said reflection optical beam; and a plurality of photodetection devices respectively detecting said plurality of optical beam elements.

According to the present invention, the reflection optical beam is divided into a plurality of optical beam elements each corresponding to a part of the reflection optical beam and traveling generally side by side as forming the reflection optical beam, wherein the plurality of optical beam elements carry respective, specific information such as tracking error information, focusing error information, the recorded information recorded on the groove, and the recorded information recorded on the land. Thereby, it is possible to extract various optical information from the reflection optical beam by a simple construction and the size of the optical information detection apparatus can be reduced successfully.

Other objects and further features of the present invention will become apparent from the following detailed description when read in conjunction with the attached drawings.

DETAILED DESCRIPTION OF THE PREFERRED EMBODIMENTS

Figure 1:
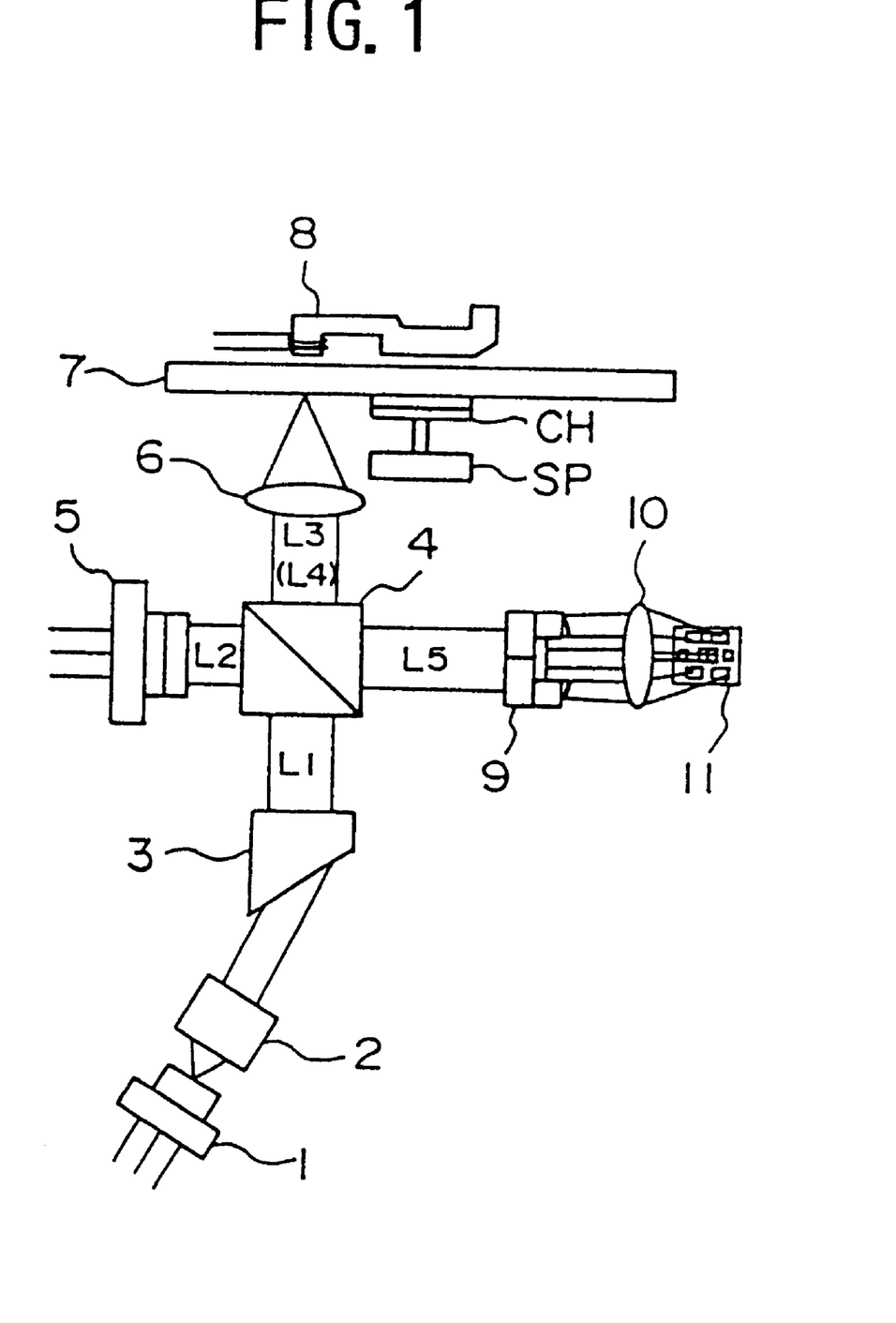
FIG. 1 is a diagram showing the construction of an optical information detection apparatus according to an embodiment of the present invention.

FIG. 1 shows the construction of an optical information recording and reproducing apparatus in which an optical information detection apparatus of the present invention is used.

Referring to FIG. 1, there is provided a laser diode 1 that produces an optical beam, wherein the optical beam is converted, after passing through a collimator lens 2 and a beam shaping prism 3, to a parallel optical beam $L_1$ having a circular beam cross-section. The optical beam $L_1$ is then directed to a polarization beam splitter 4 that divides the optical beam $L_1$ to form an optical beam $L_2$ and an optical beam $L_3$, wherein the optical beam $L_2$ is directed to a photodetector 5 for automatic optical power control.

On the other hand, the optical beam $L_3$ is directed to a magneto-optical disk 7 and is focused on a surface thereof by an objective lens 6. It should be noted that the magneto-optical disk 7 is held on a turn-table by a chuck mechanism CH and is rotated by a spindle motor SP at a high speed. Further, it should be noted that the objective lens 6 is held movably on a biaxial actuator (not illustrated) such that the objective lens is movable in a radial direction of the disk 7 and further in a direction to and from the disk 7. As noted already, the objective lens focuses the optical beam $L_3$ to a desired point on a recording surface of the magneto-optical recording disk 7 on which concentric or spiral-shaped guide tracks are formed.

Figure 2:
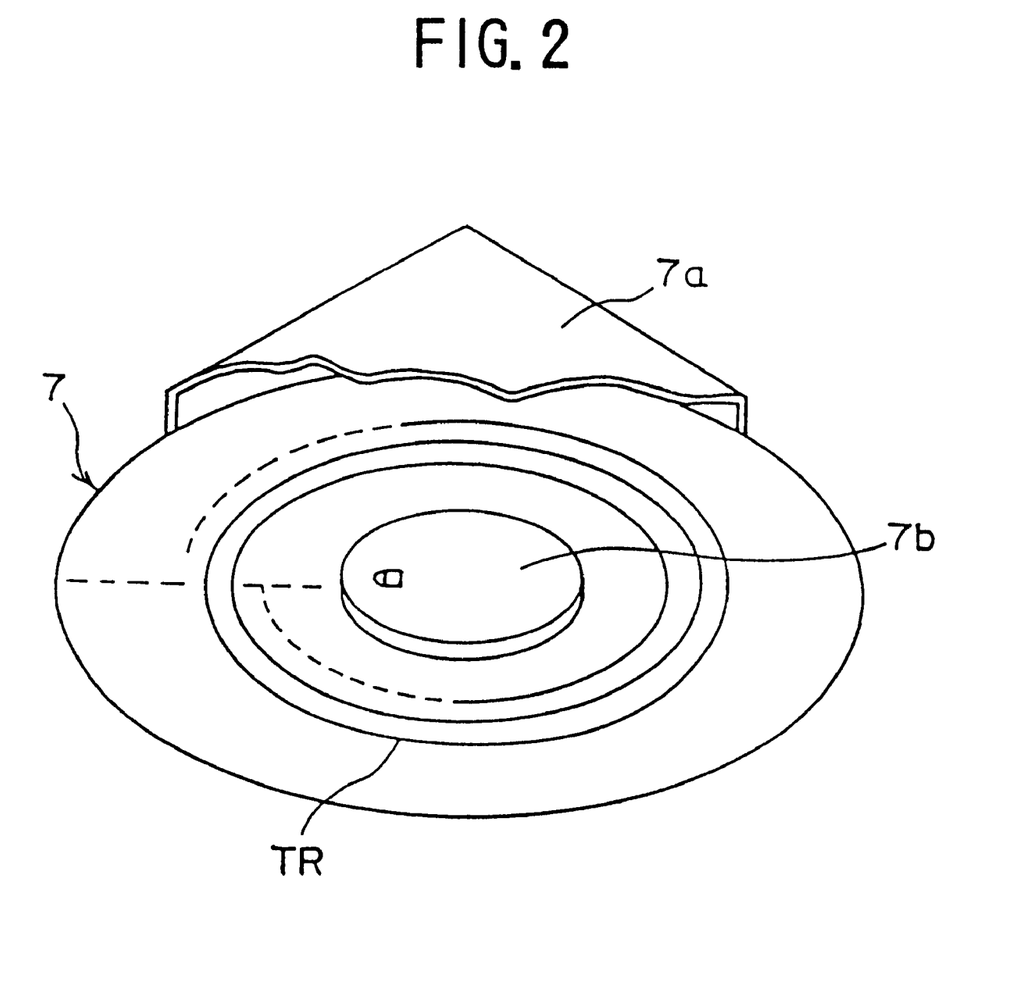
FIG. 2 is a diagram showing the construction of an optical recording medium used in the optical information detection apparatus of FIG. 1.

FIG. 2 shows the construction of the magneto-optical recording disk 7.

Referring to FIG. 2, the magneto-optical recording disk 7 has a central hub 7b and is accommodated in a case 7a, wherein a spiral track TR is formed on a recording surface of the disk 7 that faces the objective lens 3 for a tracking servo control of the objective lens 6. The spiral track TR is defined by a spiral-shaped or concentric-shaped groove and an adjacent, spiral-shaped or concentric-shaped land.

Figure 3:
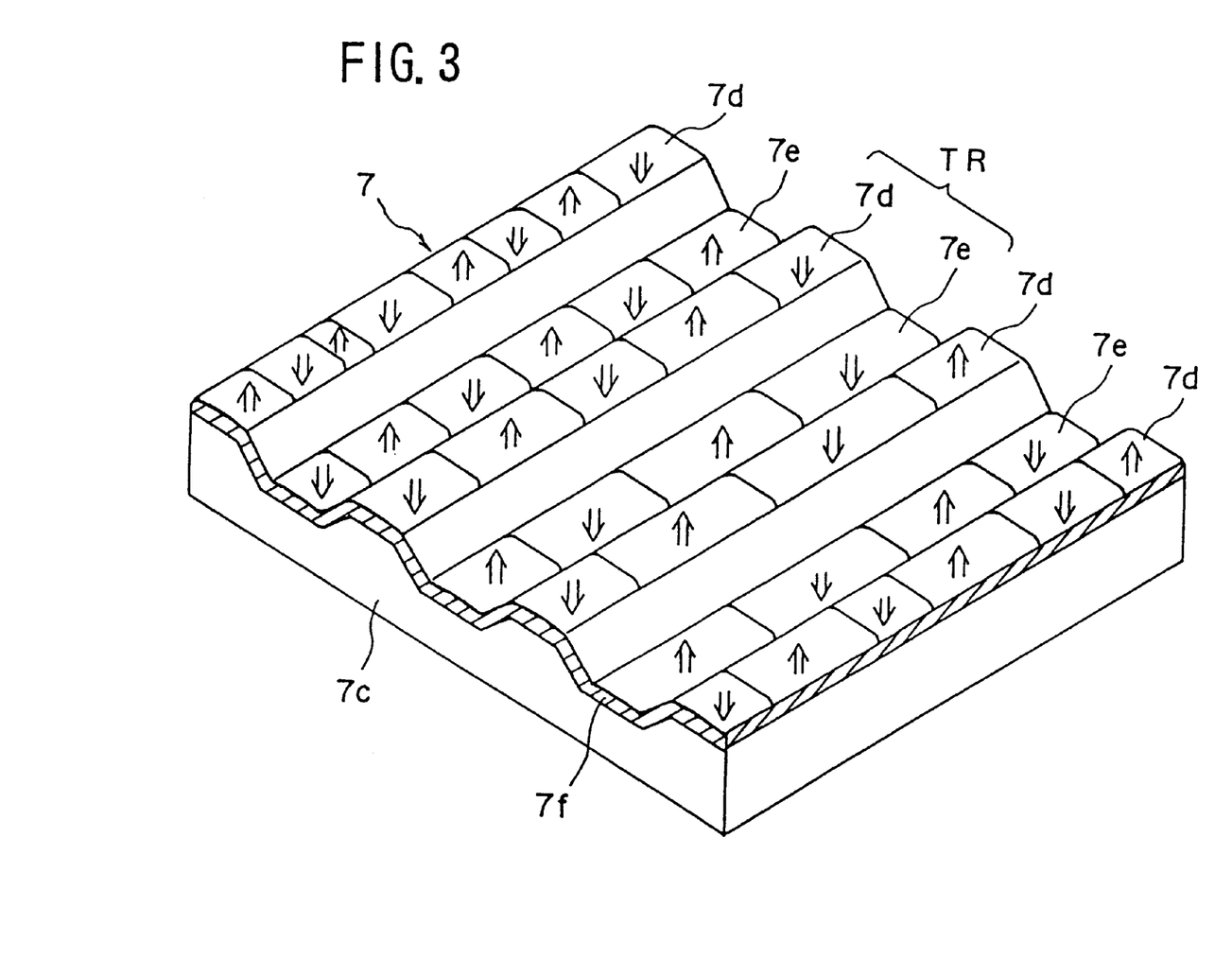
FIG. 3 is another diagram showing the construction of the optical recording medium of FIG. 2 in detail.

FIG. 3 shows the recording surface of the magneto-optical recording disk 7 in an enlarged scale.

Referring to FIG. 3, each of the tracks TR is defined by a groove 7e and a land 7e, and the surface of the disk 7 is covered by a magnetic recording film 7f. Further, a floating magnetic head 8 is disposed at the opposite side of the recording surface of the magneto-optical disk 7 as indicated in FIG. 1.

In a write mode operation of the optical recording and reproducing apparatus of FIG. 1, the magnetic recording film 7f is heated locally by the optical beam $L_3$ that is focused on the recording surface of the disk 7 with a large optical power. As a result of such a localized heating, the direction of magnetization of the magnetic film 7f is rotated according to the magnetic field of the magnetic head 8 and the writing of the information is achieved thereby.

In a read mode operation, on the other hand, the optical beam $L_3$ is focused on the recording surface of the magneto-optical disk 7 with a reduced optical power, and the plane of polarization of the optical beam, $L_3$ is rotated according to the direction of magnetization of the magnetic film 7f as the optical beam $L_3$ is reflected by the magnetic film 7f. The optical information recording and reproducing apparatus of FIG. 1 thereby detects the content of the recorded information by detecting the polarization state of the reflected optical beam.

More specifically, a reflected optical beam $L_4$ thus produced as a result of the reflection of the optical beam $L_3$ at the magneto-optical disk 7 returns to the polarization beam splitter 4 after passing through the objective lens 6 in a reverse direction, wherein the polarization beam splitter 4 reflects the reflection optical beam $L_4$ thus returned thereto to a composite optical element 9 as a reflection optical beam $L_5$. See FIG. 1.

As will be described below, the composite optical element 9 decomposes the reflection optical beam $L_5$ into respective optical beam elements representing the recorded information, focusing error information and tracking error information, wherein the optical beam elements thus produced are focused by a lens 10 on a photodetector array 11.

Figure 4A:
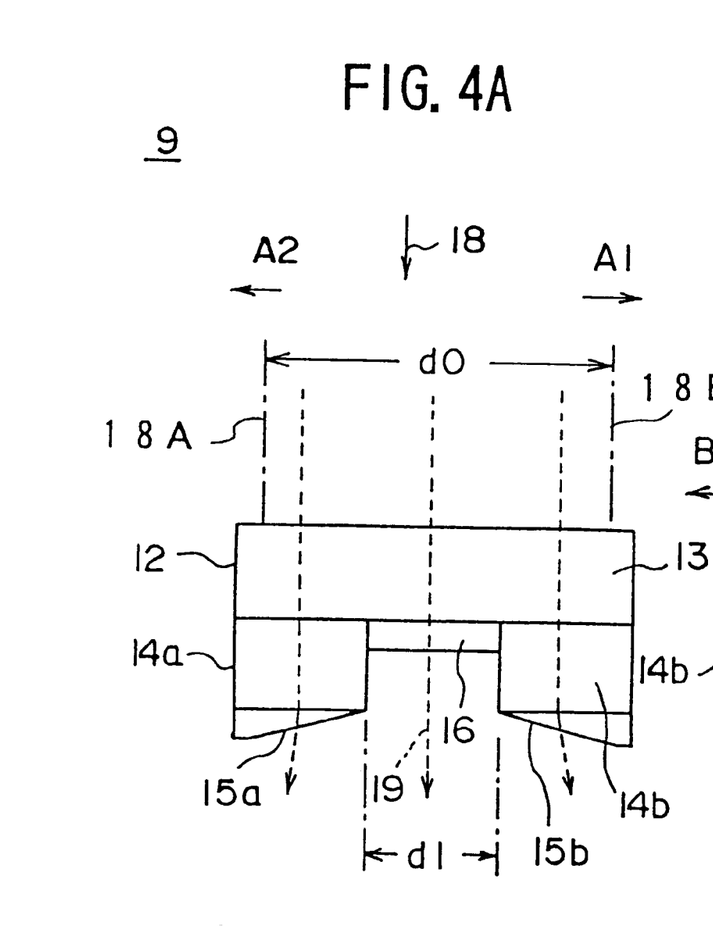
FIGS. 4A and 4B are diagrams showing a composite optical element used in the optical information detection apparatus of FIG. 1.
Figure 4B:
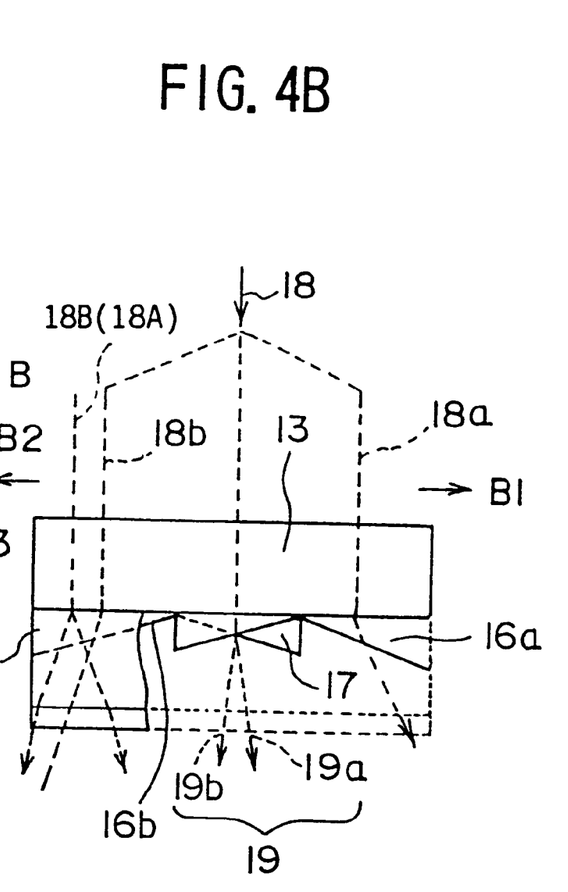

FIGS. 4A and 4B show the construction of the composite optical element 9 respectively in a front view and a side view. The same composite optical element 9 is shown also in FIG. 5 in an exploded view.

Referring to FIGS. 4A and 4B, the composite optical element 9 includes retardation plates 12 and 13 disposed adjacent with each other side by side in the $A_1$–$A_2$-direction, wherein the retardation plates 12 and 13 carry thereon a first Wollaston prism 14a and a second Wollaston prism 14b respectively. As indicated in FIG. 4A, the retardation plates 12 and 13 have an overall size corresponding to a beam size $d_0$ of an incident optical beam 18 which corresponds to the reflection optical beam $L_5$, and the Wollaston prisms 14a and 14b are separated from each other in a lateral direction of the optical element 9 with a distance $d_1$. The Wollaston prism 14a carries a wedge prism 15a thereon and the Wollaston prism 14b carries a wedge prism 15b.

Figure 5:
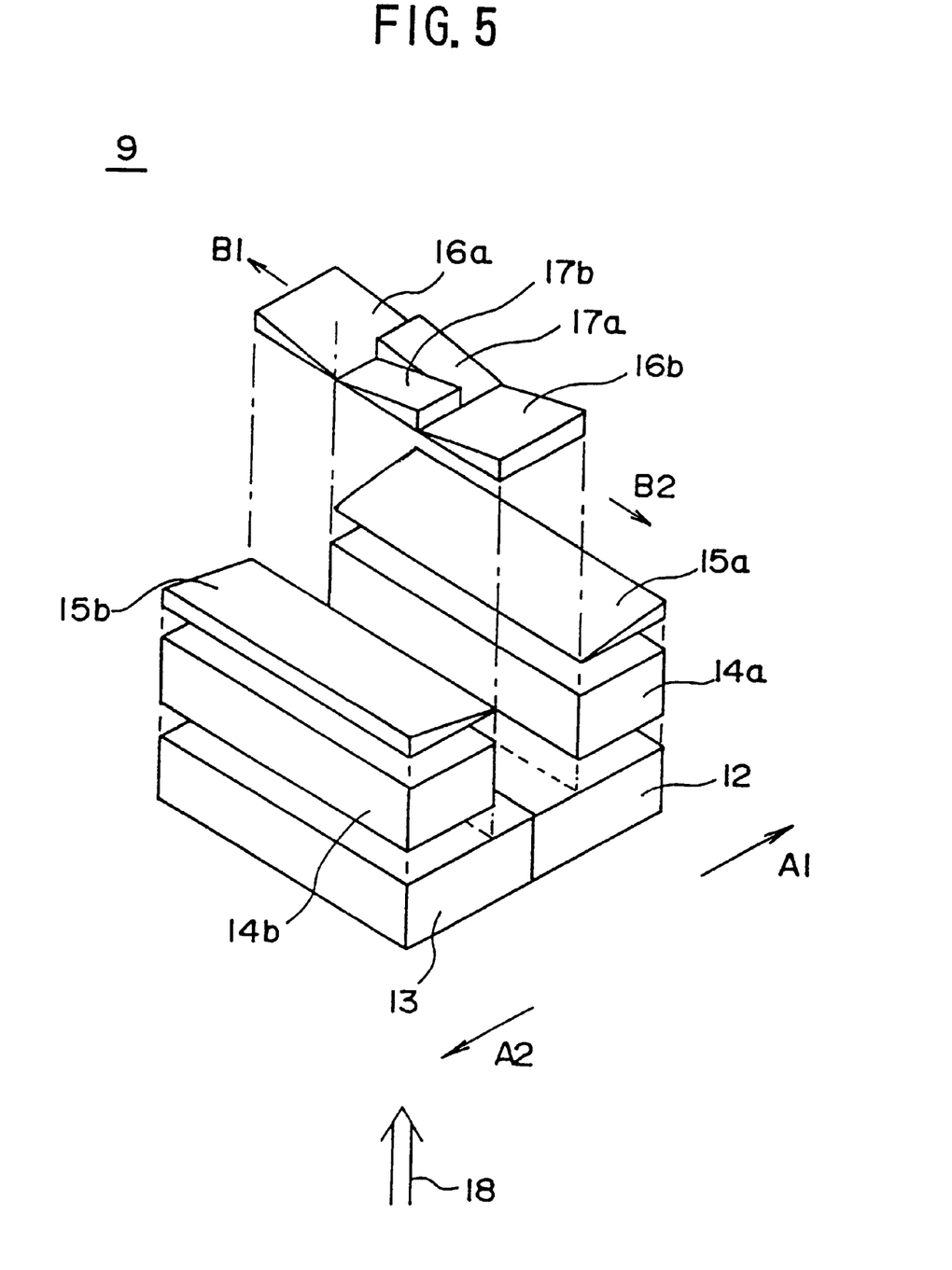
FIG. 5 is a diagram showing the composite optical element of FIGS. 4A and 4B in an exploded view.

Further, there is disposed a double-wedge prism 17 formed of wedge prisms 17a and 17b, wherein the wedge prisms 17a and 17b have respective prism surfaces inclined in mutually opposite directions on a substrate formed by the foregoing retardation plates 12 and 13 and are disposed at a central part defined by the Wollaston prisms 14a and 14b as indicated in FIG. 4B or FIG. 5. Further, the double-wedge prism 17 is laterally sandwiched by wedge prisms 16a and 16b having mutually inclined wedge surfaces in the $B_1$–$B_2$-direction.

As indicated in FIGS. 4A and 4B, the incident optical beam 18 corresponding to the reflection optical beam $L_5$ is directed to the bottom of the substrate formed of the retardation plates 12 and 13, wherein the retardation plate 12 applies an optical phase compensation to an optical beam element 18A reflected by the land 7d of the optical disk 7 of FIG. 1 and forming a part of the optical beam 18 such that the pertinent optical beam element 18A has a predetermined optical phase. On the other hand, the retardation plate 13 applies an optical phase compensation to an optical beam element 18B reflected by the groove 7e of the optical disk 7 of FIG. 1 and forming a part of the optical beam 18, wherein it should be noted that the optical phase compensation achieved by the retardation plate 13 has a magnitude that is substantially identical to the optical phase compensation achieved by the retardation plate 12 but the direction of the optical phase compensation of the retardation plate 13 is set opposite to the direction of the optical phase compensation achieved by the retardation plate 12.

The optical beam element 18A thus passed through the retardation plate 12 is then caused to enter the Wollaston prism 14a, wherein the optical beam element 18A, the optical phase of which is compensated by the retardation plate 12, experiences a deflection, inside the Wollaston prism 14a, in one of the $B_1$- and $B_2$-directions depending on the polarization state of the optical beam element. Similarly, the optical beam element 18B passed through the retardation plate 13 enters the Wollaston prism 14b and experiences a deflection inside the Wollaston prism 14b in one of the $B_1$- and $B_2$-directions depending on the polarization state of the optical beam element. See FIG. 4B.

The optical beam element 18A thus deflected by the Wollaston prism 14a is then caused to pass through the wedge prism 15a, wherein the wedge prism 15a, having a prism surface inclined in the $A_1$-direction, refracts the optical beam element 18A in the $A_1$-direction. Similarly, the optical beam element 18B thus deflected by the Wollaston prism 14b is caused to pass through the wedge prism 15b, and the wedge prism 15b, having a prism surface inclined in the $A_2$-direction, refracts the optical beam element 18B in the $A_2$-direction.

In addition, the wedge prism 16a deflects a marginal ray 18a included in the reflection optical beam 18 in the $B_1$-direction and an opposite marginal ray 18b also included in the reflection optical beam 18 in the $B_2$-direction. The marginal rays 18a and 18b thus deflected by the wedge prisms 16a and 16b are collected by the lens 10 and focused on the photodetector array 11 for the detection of a push-pull tracking error signal. Further, the optical beam elements 18A and 18B are collected by the lens 10 and are focused on the photodetector array 11 for differential detection of the recorded magneto-optical information signal.

The double-wedge prism 17 is disposed so as to intercept the core part of the reflection optical beam 18. As noted already and as indicated in FIG. 5, the double-wedge prism 17 is formed of two wedge prisms 17a and 17b disposed side by side, wherein the edge prisms 17a and 17b have respective, mutually oppositely inclined prism surfaces.

More specifically, the first wedge prism 17a is disposed on the retardation plate 12 in alignment with the edge thereof at the side of the $A_2$-direction, while the second wedge prism 17b is disposed on the retardation plate 13 in alignment with the edge thereof at the side of the $A_1$-direction. Thereby, the wedge prism 17a causes a deflection of an incident optical beam in the $B_1$-direction while the wedge prism 17b causes a deflection of an incident optical beam in the $B_2$-direction.

Thus, the double wedge prism 17 decomposes a core part 19 of the reflection optical beam 18 into two optical beam elements 19a and 19b, wherein the optical beam elements 19a and 19b are forwarded to the photodetection array 11 via the lens 10 for extracting a focusing error signal by a double Foucault process.

As noted already, the optical beam element forming the reflection optical beam 18 at the side of the core part 19 is subjected to an optical phase compensation process achieved independently by the retardation plate 12 and the retardation plate 13, and each of the optical beam elements is deflected in one of the $B_1$–$B_2$-directions by the Wollaston prism 14a or 14b according to the polarization state thereof. The optical beam elements thus separated are directed to the photodetector array 11 at the wedge prism 15a or 15b for detection of the recorded signal.

Hereinafter, the reflection occurring at the magneto-optical recording medium 7 will be explained.

As described previously, the optical beam $L_3$ illuminates both the land 7d and the groove 7e adjacent to the land 7e, and thus, the optical beam 18 corresponding to the reflection optical beam $H_4$ inevitably includes a cross-talk component.

In the case of the magneto-optical disk 7, the land 7d and the groove 7e are formed with a step height corresponding to one-eighth the wavelength of the optical beam 18, such that there appears a phase offset corresponding to one-quarter the wavelength between the optical beam element 18A reflected by the land 7d and the optical beam element 18B reflected by the groove 7e. Because of the superposition of the optical beam components 18A and 18B thus shifted in phase in the optical beam 18, there inevitably appears a cross-talk between the optical beam components 18A and 18B, and each of the optical beams 18A and 18B becomes an elliptically polarized light. Thereby, the direction of rotation of the polarization ellipse for the optical beam component 18A becomes opposite to that of the optical beam component 18B. This also means that it is possible to suppress the detection of unwanted optical beam component by setting the retardation plates 12 and 13 such that an optimum optical phase compensation is achieved separately for each of the land 7d and the groove 7e.

Thus, in the present embodiment, the retardation plate 12 is set such that the cross-talk of the optical beam component 18B to the optical beam component 18A becomes minimum and the retardation plate 13 is set such that the cross-talk of the optical beam component 18A to the optical beam component 18B becomes minimum.

It should be noted that the composite optical element 9 of FIGS. 4A and 4B merely represents an example, and the composite optical element 9 may be formed as an integral unitary body.

Hereinafter, the construction of the photodetector array 11 will be described with reference to FIG. 6.

Figure 6:
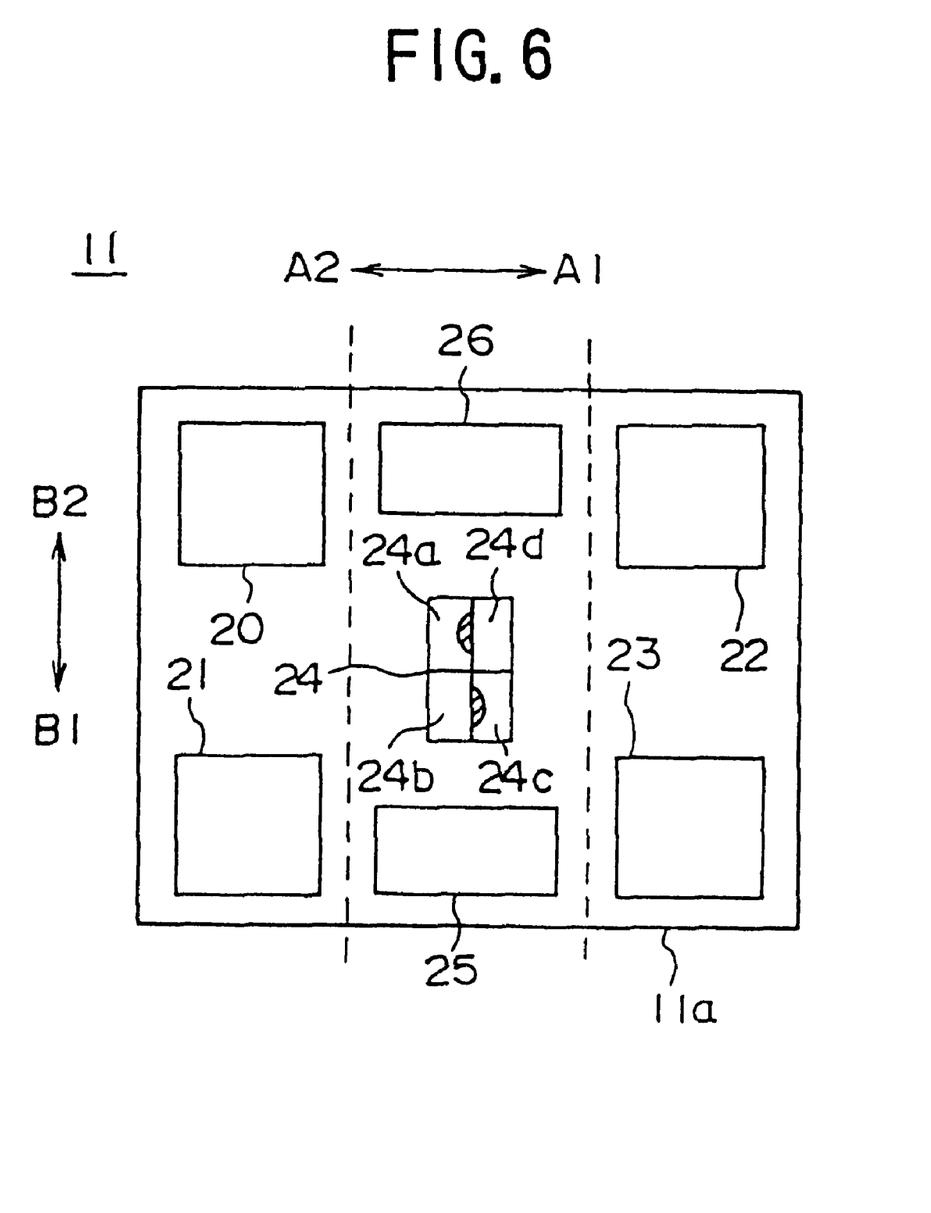
FIG. 6 is a diagram showing the construction of a photodetector array used in the optical information detection apparatus of FIG. 1.

Referring to FIG. 6, the photodetector array 11 is formed on a common substrate 11a that carries thereon first through seventh optical detectors 20–26, wherein the optical detectors 20 and 21 are disposed in alignment in the $B_1$–$B_2$-directions at a side of the substrate 11a in the $A_2$-direction. Thereby, it should be noted that the optical detector is disposed so as to receive the optical beam component 18B deflected by the Wollaston prism 14b in the $B_1$-direction, while the optical detector 21 is disposed so as to receive the optical beam component 18B deflected by the Wollaston prism 14b in the $B_2$-direction.

Further, it can be seen that the substrate 11a of the photodetector array 11 carries thereon the optical detectors 22 and 23 in alignment in the $B_1$–$B_2$-direction at a size of the substrate 11a in the $A_1$-direction. Thereby, it should be noted that the optical detector 22 is disposed so as to receive the optical beam component 18A deflected by the Wollaston prism 14a in the $B_1$-direction, while the optical detector 23 is disposed so as to receive the optical beam component 18A deflected by the Wollaston prism 14a in the $B_2$-direction.

Further, the substrate 11a of the photodetector array 11 carries thereon a central photodetection part 24 at the central part of the substrate 11a, wherein the photodetection part 24 includes four photodetection regions 24a–24d in correspondence to four quadrants.

Furthermore, the substrate 11a of the photodetector array 11 carries thereon photodetectors and 26 at both sides of the central photodetection part 24 in the $B_1$–$B_2$-directions, wherein the photodetector 25, located at the side of the $B_1$-direction of the central photodetection part 24, detects the optical beam deflected by the wedge prism 16a in the $B_1$-direction. Further, the photodetector 26 at the $B_2$-side of the photodetection part 24 detects the optical beam deflected by the wedge prism 16b in the $B_2$-direction.

In the photodetector array 11 of FIG. 6, it should be noted that the information recorded on the land 7d of the optical disk 7 is reproduced by obtaining a difference between a detection signal detected by the photodetector 20 and a detection signal detected by the photodetector 21. On the other hand, the information recorded on the groove 7e of the optical disk is reproduced by obtaining a difference between a detection signal detected by the photodetector 22 and a detection signal the photodetector 23.

On the other hand, a focusing error signal is obtained by applying a predetermined operation to be described below to the detection signals obtained by the photodetectors 24a–24d forming the central photodetection part. Further, a tracking error signal is obtained by obtaining a difference between the detection signal detected by the photodetector 25 and the detection signal detected by the photodetector 26.

Hereinafter, a more detailed description will be made on the construction for reproducing the recorded information from the land 7d and from the groove 7e of the optical disk 7 as well as the construction for extracting the tracking error signal and the focusing error signal.

Figure 7:
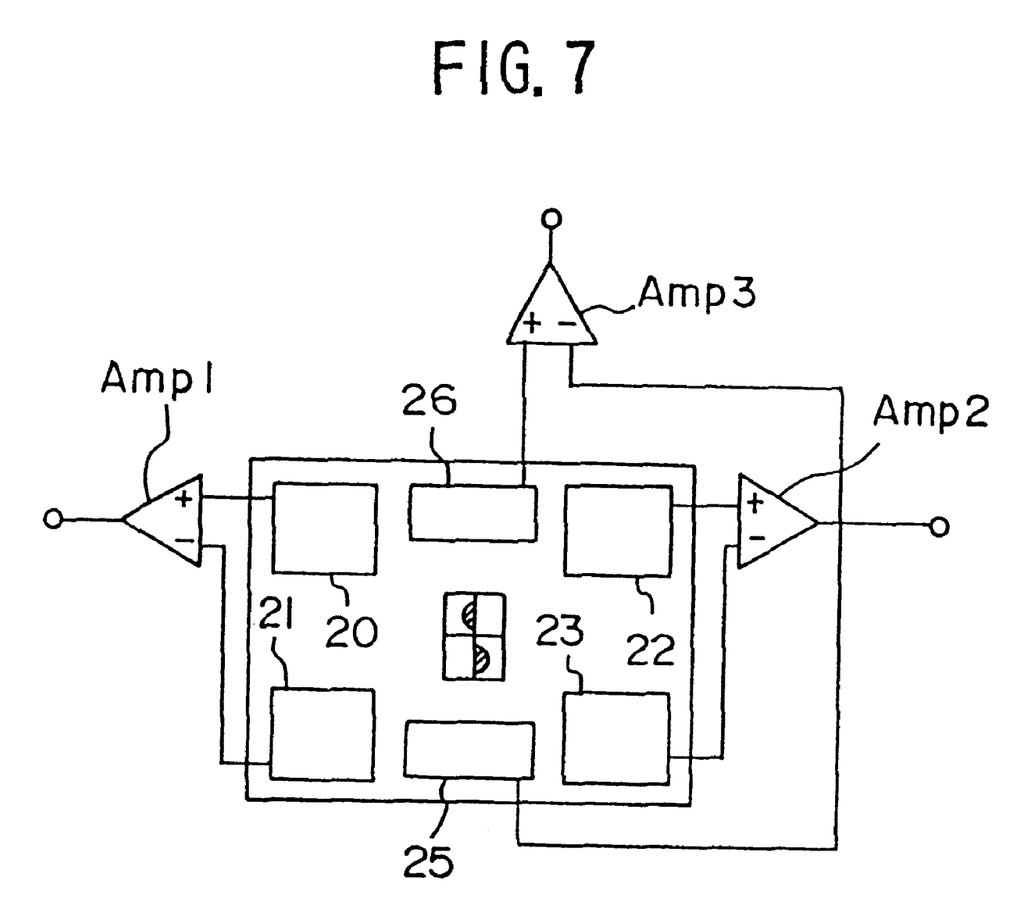
FIG. 7 is a circuit diagram showing a detection circuit used in the optical information detection apparatus of FIG. 1 for reading the information from the optical recording medium.

FIG. 7 shows the construction for reproducing the recorded information from the land 7d and the groove 7e as well as the construction for obtaining the tracking error signal.

Referring to FIG. 7, there is provided a first differential amplifier Amp1 such that a non-inverting input terminal thereof is connected to the first photodetector 20 and an inverting input terminal thereof connected to the second photodetector 21. Thereby, the differential amplifier Amp1 produces an information signal corresponding to the information recorded on the land 7d of the optical disk 7 as the difference between the output of the photodetector 20 and the photodetector 21. It should be noted that the photodetectors 20 and 21 receive the optical beam element 18A of which optical phase is compensated by the retardation plate 13 such that the cross-talk from the groove 7e is minimized.

Further, there is provided a second differential amplifier Amp2 such that a non-inverting input terminal thereof is connected to the photodetector 22 and an inverting input terminal thereof connected to the photodetector 23. Thereby, the differential amplifier Amp2 produces an information signal corresponding to the information recorded on the groove 7e of the optical disk 7 as the difference between the output of the photodetector 22 and the photodetector 23. It should be noted that the photodetectors 22 and 23 receive the optical beam element 18B of which the optical phase is compensated by the retardation plate 12 such that the cross-talk from the land 7d is minimized.

FIG. 7 further shows another differential amplifier Amp3 having an inverting input terminal connected to the photodetector 25 and a non-inverting input terminal connected to the photodetector 26, wherein the differential amplifier Amp3 produces the tracking error signal as a difference between the output of the photodetector 26 and the output of the photodetector 25. It should be noted that the photodetectors 25 and 26 receive the reflected optical beams from the land 7d and the groove 7e, wherein the photodetectors 25 and 26 receive the same amount of optical radiation when the center of the optical beam $H_3$ used for reading the information is located exactly on the boundary of the land 7d and the groove 7e. In such a case of ideal tracking, the photodetectors 25 and 26 produce the same output signal and the output of the differential amplifier Amp3 becomes zero.

When there is a deviation in the tracking, on the other hand, there appears a difference in the optical beam intensity between the optical beam received by the photodetector 25 and the optical beam received by the photodetector 26. For example, the intensity of the optical beam received by the photodetector 26 may decrease when the intensity of the optical beam received by the photodetector 25 is increased, or vice versa. Thus, when the output of the photodetector 25 is increased, the output of the photodetector 26 is decreased and the differential amplifier Amp3 produces a negative output. In the opposite case, the differential amplifier Amp3 produces a positive output. Thus, the differential amplifier Amp3 produces an output signal indicative of the tracking state as the tracking error signal.

Figure 8:
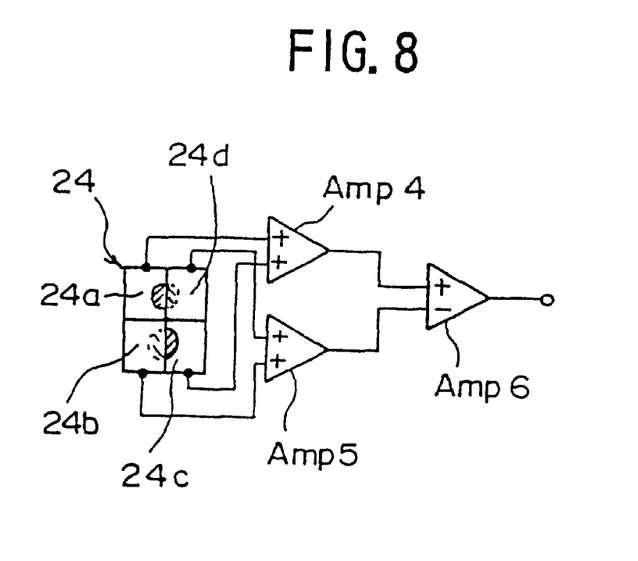
FIG. 8 is another circuit diagram showing another detection circuit used in the optical information detection apparatus of FIG. 1 together with the circuit of FIG. 7.

FIG. 8 shows a construction used for detecting a focusing error signal.

Referring to FIG. 8, there is provided a summation amplifier Amp4 connected across the photodetector 24a and the photodetector 24c aligned in a diagonal direction in the central photodetection part 24, and another summation amplifier Amp5 is connected across the photodetector 24b and the photodetector 24d aligned also in another diagonal direction of the central photodetection part 24. Wherein the summation amplifiers Amp4 and Amp5 produce an output indicative of a summation of the input signals supplied thereto. Further, there is provided a differential amplifier Amp6 having a non-inverting input terminal to which the output of the summation amplifier Amp4 is supplied and an inverting input terminal to which the output of the output of the summation amplifier Amp5 is supplied, wherein the summation amplifiers Amp4 and Amp5 carry out, together with the differential amplifier Amp6, a focusing detection according to a double Foucault process.

More in detail, the double Foucault process utilizes the nature of the reflection optical beam that the reflection optical beam has a circular beam shape when the optical beam is focused properly on the reflection surface. In such a properly focused state, therefore, the photodetectors 24a–24d produce a generally identical output and the differential amplifier Amp6 produces a zero output.

When the focusing state of the optical beam is offset from the properly focused state, on the other hand, there is a tendency that the photodetectors 24a and 24c receive increased optical radiation and the photodetectors 24b and 24d receive decreased optical radiation, or vice versa. In such a state therefore, the summation amplifier Amp4 produces a larger output and the summation amplifier Amp5 produces a smaller output, or vice versa, and the output of the differential amplifier Amp6 is no longer zero. In fact, the differential amplifier Amp6 produces a positive output when the output of the summation amplifier Amp4 is increased and the output of the summation amplifier Amp5 is decreased or a negative output when the output of the summation amplifier Amp5 is increased and the output of the summation amplifier Amp4 is decreased. Thus, the focusing error signal is obtained as an output of the differential amplifier Amp6.

Figure 9:
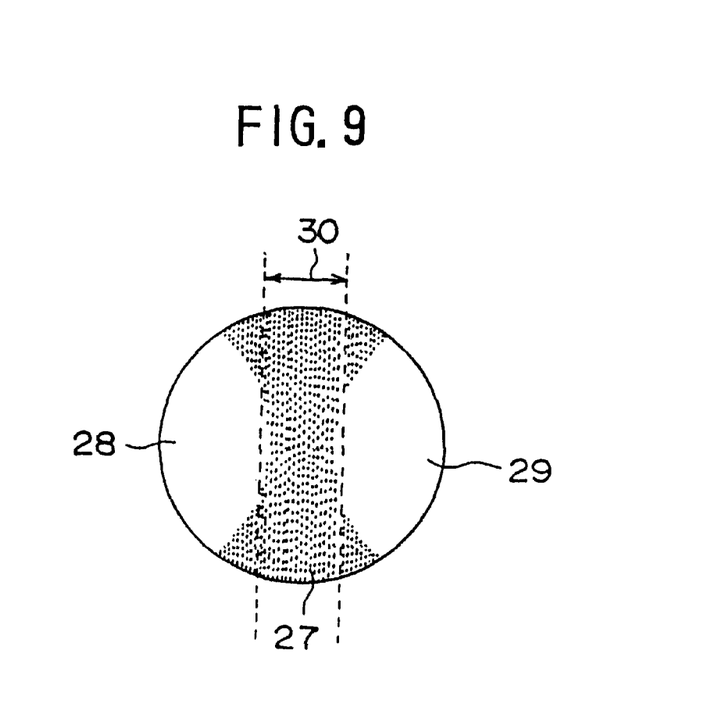
FIG. 9 is a diagram showing a diffraction pattern of a reflection optical beam obtained by the composite optical element of FIGS. 4A and 4B.

FIG. 9 shows a diffraction pattern obtained in the reflection optical beam $L_4$ reflected by the optical disk 7. Because of the presence of the land and grooves repeated with a periodical pitch, it should be noted that the optical beam $L_3$ focused on the recording surface of the optical disk 7 experiences a diffraction and the reflection optical beam $L_4$ produced as a reflection of the optical beam $L_3$ shows the diffraction pattern as indicated in FIG. 9.

Referring to FIG. 9, the diffraction pattern includes a band-shaped zeroth-order diffraction beam 27 having a width 30 and two first-order diffraction beams 28 and 29 at both sides of the zeroth-order beam 27, wherein the zeroth-order beam 27 does not carry information of the recording mark in the optical recording and reproducing apparatus of FIG. 1 in which the recording mark has a length smaller than the size of the beam spot. Thus, the resolution of the optical information detection in the optical recording and reproducing apparatus of FIG. 1 can be improved by cutting off the zeroth-order diffraction beam 27.

In the present invention, rather than providing a shading band contrary to the teaching of Milster et al., op cit., the Wollaston prisms 14a and 14b are separated from each other with the separation $d_1$ set coincident with the zeroth-order diffraction beam 27, and the first-order diffraction beams 28 and 29 are processed by the Wollaston prisms 14a and 14b and directed to the photodetectors 20 and 21 or to the photodetectors 22 and 23 for information detection. Further, the zeroth-order beam 27 is used also effectively for the tracking control and the focusing control explained before, by providing the wedge prisms 16a, 16b and 17a, 17b in correspondence to the optical path of the zero-th order beam 27.

In the construction of the magneto-optical recording and reproducing apparatus of FIG. 1, it should be noted that a laser diode producing an output optical beam with a wavelength of 650 nm is used for the laser diode 1, and a lens having a numerical aperture of 0.6 is used for the objective lens 6. Further, the direction of polarization of the reflection optical beam $H_4$ reflected by the optical disk 7 is set generally parallel to the elongating direction of the land 7d and hence the groove 7e. In the case the direction of polarization is set perpendicular to the elongating direction of the land 7d and the groove 7e, a 1/T wavelength plate may be used for rotating the polarization plane by 90° in the optical detection system.

In the magneto-optical disk 7, a glass disc having a thickness of 0.6 mm may be used for the substrate 7c, and the land 7d and the groove 7e may be formed with a tack pitch of 1.2 $\mu$m (effective track pitch of 0.6 $\mu$m) by using a photo-polymer forming process. On the substrate 7c, the recording film 7f is formed as a four-layer stacking structure including a dielectric layer, a magneto-optical recording layer, another dielectric layer and a metal reflection layer. The recording film 7f may be formed by a sputtering process and is covered by a protective film of a UV-cure resin with a thickness of several microns. As described previously, the groove 7e is formed to have a depth corresponding to one-eighth (⅛) the wavelength of the laser beam used for reading information.

It should be noted that the material of the substrate 7c is by no means limited to a glass disc noted above but an injection molded plastic disc of polycarbonate, and the like, may also be used as long as the plastic disc has minimal warp and little birefringence.

In the present embodiment, the recording film 7f may include an amorphous alloy film of TbFeCo as the magneto-optical recording layer. When the TbFeCo alloy is used for the magneto-optical recording layer, the recording film 7f provides a Kerr rotation angle of 0.9°, a Kerr ellipticity of 0° and a reflectance of 18%, including the contribution from the four-layer structure. Further, a multilayer film for MSR be used for the magneto-optical film 7f.

The writing of information onto the magneto-optical disk 7 may be achieved by using a floating magnetic head that creates a modulation magnetic field in combination with a pulse-assisted magnetic modulation process in which a laser pulse is applied in synchronization with the writing of information. While it is possible to carry out the recording of information by a magnetic field modulation process that uses a DC laser beam or by an optical modulation process, the use of the pulse-assisted magnetic modulation process is preferred in view of improved quality of reproduced signal output.

In FIG. 4A, it should be noted that the width $d_1$ of the composite optical element 9 is optimized in the state that the retardation plates 12 and 13 are not provided, by measuring the signal strength while cutting the reflection beam by a knife edge. In the illustrated example, the width $d_1$ is set to 1.5 mm for the beam diameter $d_0$ of 6 mm.

Further, it should be noted that the optimum value of the retardation of the retardation plates 12 and 13 is obtained by reading out the information signal from the land 7d and the groove 7e while changing the retardation variously by using a Babinet-Soleil compensator.

In the present embodiment, a wavelength plate having a retardation value of 0.07 wavelength is used for the retardation plates 12 and 13 such that the orientation of the wavelength plate is perpendicular in the retardation plate 12 and the retardation plate 13. Thereby, an optical phase compensation of +0.07 wavelength is achieved for the land 7d and an optical phase compensation of −0.07 wavelength is achieved for the groove 7e. An optically uniaxial crystal such as calcite, quartz or $LiNbO_3$ may be used for the retardation plates 12 and 13. In addition, it is also possible to use a 0.07-wavelength plate having a thickness of about 1 mm in which two quartz plates are bonded with each other in a relationship such that the crystal axes thereof intersect perpendicularly with each other.

TABLE I below shows the result of measurement of CNR (carrier-noise ratio) and the cross-talk for the magneto-optical recording and reproducing apparatus of the present invention.

TABLE I

|  | present invention | comparative exp. |
| --- | --- | --- |
| CNR |  |  |
| land | 45.3 dB | 42.1 dB |
| groove | 45.8 dB | 42.3 dB |
| Cross-talk |  |  |
| land | −30.2 dB | −10.3 dB |
| groove | −30.0 dB | −11.1 dB |

Referring to TABLE I, the measurement was made by first erasing information from a selected land 7d and two adjacent grooves 7e at both sides of the selected land 7d, writing information onto the selected land 7d, and reading the information by using the detection system for the land. The measurement for the groove 7e is conducted similarly, by exchanging the land 7d and the groove 7e. In the measurement, the magneto-optical disk 7 is driven at a linear velocity of 5 m/sec and a laser power of 1.5 mW was used on the recording medium 7. In the recording of information, a recording mark having a length of 0.45 μm was recorded under the existence of modulation magnetic field of ±1500 Oe, by irradiating a laser beam having a pulse duty of 40% and an optical power of 7.5 mW in synchronization with the modulation magnetic field.

In the experiment of TABLE I, the measurement of cross-talk was conducted as follows.

In the case of measuring the cross-talk on the signal recorded on a selected lank 7d, the information on the selected land 7d as well as the information recorded on the grooves 7e at both sides of the selected land 7d are first erased, and recording of information is conducted on the selected land 7d. Next, a measurement is made on a signal output level CL reproduced by the signal detection system for the land, while tracking the land 7d on which the recording of the information has been made previously. It should be noted that the signal detection system for the land includes the photodetectors 20 and 21 and the amplifier Amp1 of FIG. 7.

Next, a tracking is made for each of the adjacent grooves 7e, and a measurement is made on a signal output level CR reproduced by the signal detection system for the groove, for each of the adjacent grooves 7e. It should be noted that the signal detection system for the groove includes the photodetectors 22 and 23 and the amplifier Amp2. Thereby, the cross-talk is calculated as a difference between signal level CR and the signal level CL (CR−CL), wherein the groove 7e that provides a larger output level CR is used in the foregoing calculation of the cross-talk. Further, the measurement of the cross-talk for a groove 7e is conducted similarly as above, by exchanging the land 7d and the groove 7e.

In the foregoing measurement of the cross-talk, it should be noted that a recording mark having a length of 1.35 μm is used. Otherwise, the measurement was conducted similarly to the measurement of the CNR.

Further, TABLE I above includes result also for a comparative experiment, in which the retardation plates 12 and 13 are removed from the composite optical element 9.

Referring to TABLE I, it can be seen that the present invention achieves an increase of the CNR of +3 dB as compared with the comparative experiment, wherein the increase of +2 dB is attributed to the contribution of the elimination of the zeroth-order beam 27 shown in FIG. 9, while the increase of +1 dB is attributed to the increase of the carrier level in the reproduced signal as a result of the optical phase compensation.

Further, TABLE I indicates that the cross-talk is suppressed to −30 dB.

Next, a description will be made on the recoding and playback margin for the magneto-optical recording apparatus of the present invention.

Figure 10:
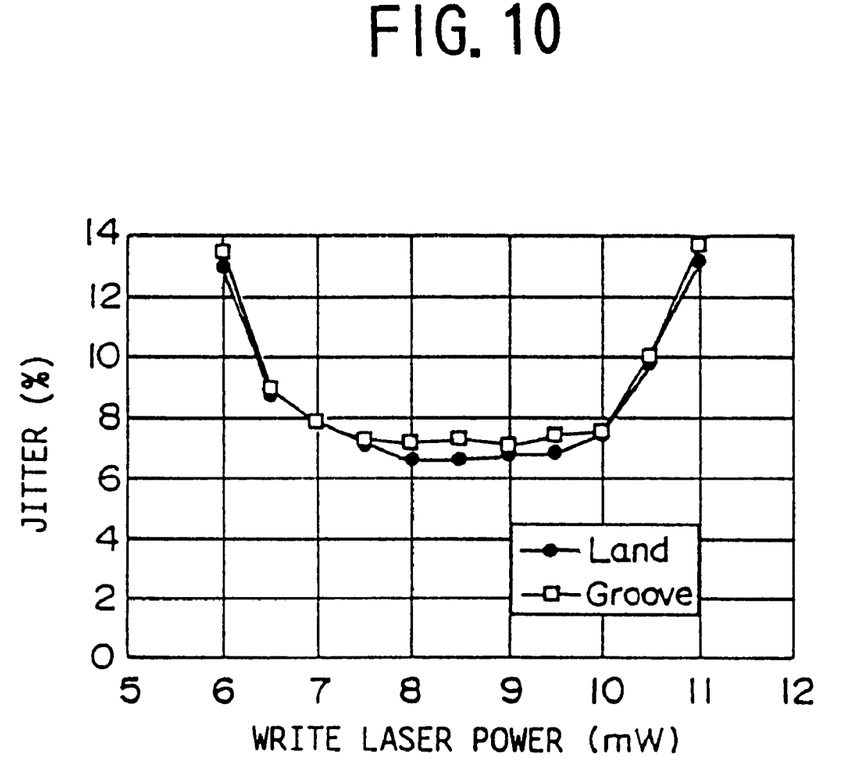
FIG. 10 is a diagram showing a jitter of a recording mark formed on the optical recording medium used in the optical information detection apparatus of FIG. 1 for various recording optical power.

FIG. 10 shows the relationship between the jitter and the optical power used for writing information, wherein FIG. 10 represents the result of measurement of the jitter of a 2 T signal for the case in which a random signal of the RLL1–7 format is recorded both on a land 7d and an adjacent groove 7e with a minimum mark length of 0.45 μ. In the measurement of FIG. 10, it should be noted that the linear velocity of the magneto-optical disk 7 is set to 5 m/sec at the time of reading of the information, and the reading of the information is achieved by setting the laser power to 1.5 mW on the disk 7.

As can be seen in FIG. 10, a jitter of less than about 8% is achieved when the write optical power is set to a range between 7 mW and 10 mW. The result of FIG. 10 indicates that a recording density of 3.2 Gbit/inch$^2$ can be achieved by the magneto-optical information recording and reproducing apparatus of the present invention.

Thus, the present invention provides a magneto-optical information recording and reproducing apparatus as well as an optical information detection system used therein wherein the cross-talk between the lands and grooves on the magneto-optical recording disk is minimized and wherein the interference between the recording marks aligned on a track is also minimized.

Further, it should be noted that, while the present invention has been described for a magneto-optical information recording and reproducing apparatus, the present invention is by no means limited to such a specific apparatus but is applicable also to ROM disks, write-once-read-many disks and phase transition disks in which phase pits are formed.

Further, the present invention is not limited to the embodiments described heretofore, but various variations and modifications may be made without departing from the scope of the invention.

The present application is based on Japanese priority application No. 10-23147 filed on Feb. 4, 1998, the entire contents of which are hereby incorporated by reference.

What is claimed is:

1. An optical beam dividing element, comprising:
   first and second optical phase compensation plates disposed side by side to form a unitary substrate;
   first and second Wollaston prisms provided on said first and second optical phase compensation plates respectively with a mutual separation from each other in a first direction;
   first and second wedge prisms respectively provided on said first and second Wollaston prisms, said first and second wedge prisms having respective prism surfaces inclined with each other;
   third and fourth wedge prisms disposed on said unitary substrate between said first and second Wollaston prisms with a separation from each other in a second direction perpendicular to said first direction, said third and fourth wedge prisms having respective, mutually inclined third and fourth prism surfaces; and
   fifth and sixth wedge prisms provided on said unitary substrate between said third and fourth wedge prisms, said fifth wedge prism having a fifth prism surface inclined to said third wedge prism, said sixth wedge prism having a sixth prism surface inclined to said fourth wedge prism.

2. An optical beam dividing element as claimed in claim 1, wherein said first optical phase compensation plate and said second optical phase compensation plate act oppositely and have the same magnitude.

3. An optical beam dividing element as claimed in claim 2, wherein said first optical phase compensation plate induces an optical phase shift to an optical beam incident thereto by +0.07 times a wavelength of said optical beam, and wherein said second optical phase compensation plate induces an optical phase shift to an optical beam incident thereto by −0.07 times a wavelength of said optical beam, which is incident to said second optical phase compensation plate.

4. An optical beam dividing element as claimed in claim 1, wherein said first optical phase compensation plate comprises an optically uniaxial crystal and said second optical phase compensation plate comprises an optically uniaxial crystal, said first optical phase compensation plate and said second optical phase compensation plate being disposed such that an optical axis of said first optical phase compensation plate and an optical axis of said second optical phase compensation plate intersect perpendicularly.

* * * * *

UNITED STATES PATENT AND TRADEMARK OFFICE
CERTIFICATE OF CORRECTION

PATENT NO. : 6,359,851 B2
DATED : March 19, 2002
INVENTOR(S) : Nobuhide Aoyama

It is certified that error appears in the above-identified patent and that said Letters Patent is hereby corrected as shown below:

<u>Title page,</u>
Item [75], Inventors, please delete the name of "Shinya Hasegawa"

Signed and Sealed this

Fifteenth Day of October, 2002

Attest:

Attesting Officer

JAMES E. ROGAN
Director of the United States Patent and Trademark Office